Patented Mar. 14, 1939

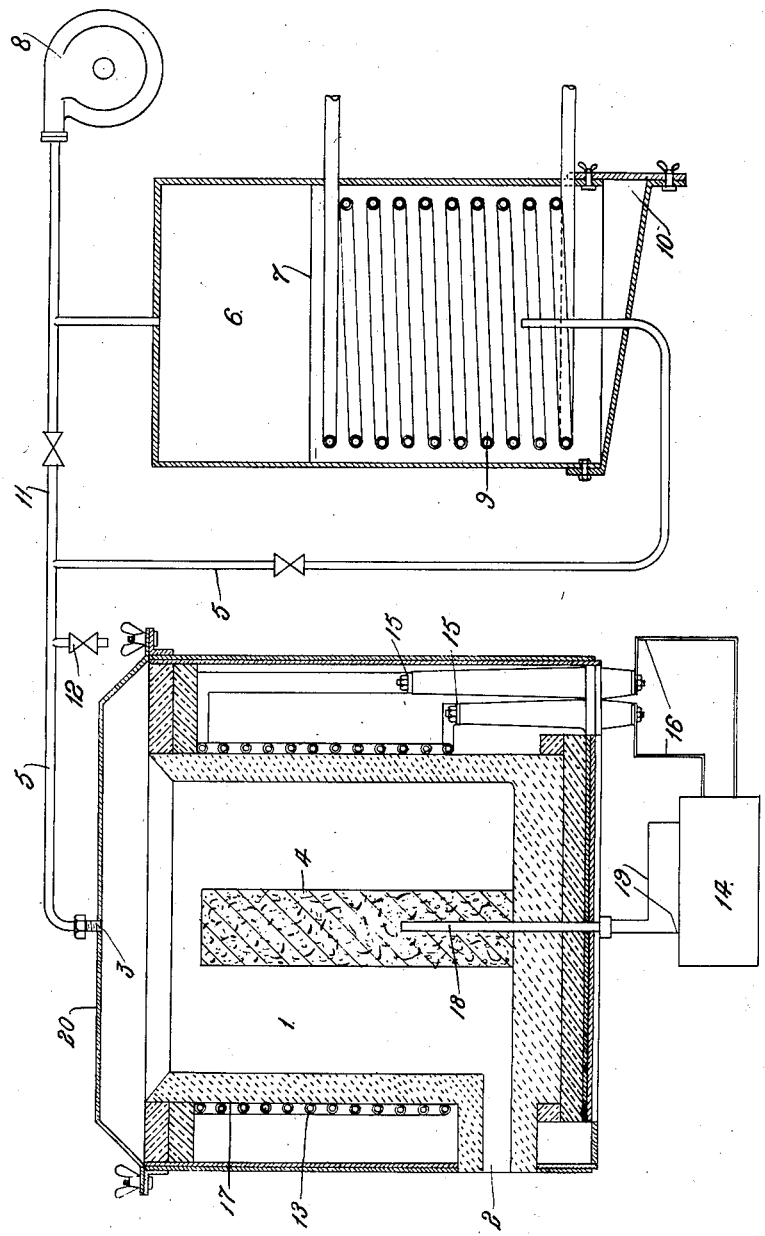

2,150,261

UNITED STATES PATENT OFFICE 2,150,261

PROCESS FOR SEPARATING PHOSPHORUS AND LIKE ELEMENTS FROM ORES

Harold Alexandre Blackwell and William Lawrence Turner, Garston, Liverpool, England Application November 26, 1937, Serial No. 176,754
In Great Britain December 10, 1936

7 Claims. (Cl. 75—10)

This invention is for an improved process for separating phosphorus and like elements from ores or compounds containing phosphorus, for example, iron ores. The elements like phosphorus included in the invention are those which are solids at N. T. P. and are set out in the horizontal line, series 3, of the periodic table in which phosphorus is classified, and comprise sodium, silicon, sulphur and aluminium.

From one point of view the present invention consists in separating phosphorus and like elements which sublime at low temperatures from ores containing such elements and in which the metal in the ore has a relatively high boiling point compared with phosphorus.

From another point of view the invention provides a process for producing non-phosphoric pig iron from iron ore, and under certain circumstances silicon-free pig iron from iron ore having a substantial proportion (for example 13%) of silicon present in the ores as quartz and silicates of iron.

The apparatus employed for effecting the separation of phosphorus and like elements as above described from their ores forms no part of the present invention. One typical apparatus in which the invention may be carried out is shown diagrammatically in the accompanying drawing and comprises a closed fire-brick still 1 of cylindrical shape having a tapping aperture 2 in its base and a draw-off aperture 3 in its upper portion. Located centrally of the still is a heat generator or primer 4 comprising a coke core built up with granular coke of a granular size of about ¾" diameter. The draw-off aperture 3 in the upper part of the still is connected by a valve-controlled conduit 5 to a condenser which, when phosphorus has to be recovered comprises a closed water tank 6 and beneath the free surface 7 of the water in the tank is led the outlet conduit 5 from the still. The free space above the water in the tank is continuously evacuated by a suction pump 8 and the water in the tank is cooled by, say, a submerged coil 9 so as to promote the condensation of phosphorus in the foot of the tank from which it can be tapped off through an outlet aperture 10. Other unwanted gases bubble through the water and are extracted by the pump. A by-pass conduit 11 extends between the conduit leading from the still to the inlet of the suction pump, and this conduit is valve-controlled so that the passage of the gases from the still can be directed either into the condenser or directly to the exhaust pump. A sampling cock 12 is provided in the conduit leading from the still so as to permit of sampling of the gases resulting from the reaction.

For a cylindrical still of about 3¼ metres in diameter and 4½ metres in height, 12 high frequency induction copper tube coils 13 are employed, each coil being associated with a thermionic valve oscillator in accordance with known practice. The bank of oscillators is indicated at 14 and the induction coils are connected thereto by insulated terminal fittings 15 and leads 16. The exterior of the still is coated with a heat-resisting paint 17 to seal the still against penetration of outside air.

The central coke core 4 in the still has a pyrometer 18 or thermostat embodied therein and connected to the oscillation generator 14 by leads 19 so that the energy supplied to the induction coil can be controlled in accordance with the temperature of the heat generator in the still. If desired a thermostatic control of the current supplied to the coil may be arranged by locating a thermostat at or near the draw-off aperture 3 in the upper part of the still so that the temperature of the outgoing gases exercises control.

The high frequency induction is generated by an oscillator, such as a thermionic valve, capable of providing a frequency which will quickly raise the graphitic reducing agent of the charge to a red heat, and the frequency must be higher than 3000 cycles per second (where the sub-divided graphite has a granular size of ¾" diameter) otherwise the graphite will not be raised to a temperature capable of reducing phosphorus from the iron ore. The preferred frequency is much higher than 3000 cycles per second and is of the order of 300,000 cycles per second.

One example of the process will now be described. 30 lbs. of low grade iron ore containing approximately 32% of iron, 1.3% apatite ($P_2O_5$), 13% silicon (as quartz and silicates of iron) .28% sulphur, and the balance in impurities, is mixed with a quantity of sub-divided coke which is 20% in excess of the approximate chemical balance for reduction of the iron and the impurities. The mix is charged into the still by removing the detachable cover 20; and after charging has been completed the cover is replaced and the tapping aperture is sealed by the usual plug of ganister and a binder. The suction pump is first connected to the still and a pressure of 50 mm. (barometric) is established inside the still. The vacuum in the still is maintained at about 50 mm. The still is then connected to the condenser. The furnace is started up and the valves tuned in until the furnace is operating at 300,000 cycles per second. After a short time an intense heat is generated in the coke, and a considerable evolution of gases takes place. These bubble through the water in the condenser and are drawn off by the pump. The temperature is maintained above the boiling point of phosphorus, but below the boiling point of iron, preferably at 600° C. This temperature of 600° C. is thermostatically maintained. A sample of the evolved gases is taken at the sampling cock and when evolution of phosphorus vapour has ceased the condenser is cut out and the gases are led directly to the exhaust pump. The vacuum in the still is maintained but the thermostat is rendered inoperative and the residual mass is heated up by induction to make the iron moltent. The still is then tapped and a recovery of pig iron obtained. When run off in a molten condition the pig iron is coated with an unsintered scum but on cooling the scum is easily removed by brushing, and 8¾ lbs. of pig iron obtained, giving an analysis of 4.1% carbon, 0.002% sulphur, and 95.898% iron. There was no phosphorus or silicon in the pig iron. 2¼ ozs. of substantially pure phosphorus were recovered from the water in the condenser.

It is thought that since the reduction was carried on at a temperature of approximately 600° C. the phosphorus is reduced and distilled over into the condenser and the silicates separate from the iron and float on the iron when it is subsequently made molten in an unsintered condition, and that therefore although the silicates are not reduced or distilled they are freed from the iron in the still.

An example of the invention as applied to the reduction of aluminium from bauxite is as follows:

A mixture of finely divided bauxite and coke in ¼" grains in the proportion 2 parts by weight bauxite to 1 part by weight coke is placed in a dish or crucible of fused alumina. The air is exhausted from the still until a pressure of 20 mm. is established inside the still. The high frequency induction is started up and operating at 380,000 cycles per second, the charge is heated to a temperature above the boiling point of aluminium, and bright aluminium metal is recovered on condensation.

Shock cooling of the vaporized aluminium may be employed for example in small scale operations it is possible to coat a cooled surface of glass with mirror-bright aluminium metal by subliming the metal on to the glass in the still.

In recovering sublimed silicon the procedure is as follows:

Approximately 8 parts by weight quartz dust (98.75% SiO₂) is mixed with 3 parts by weight coke of approximately ¹⁄₁₀" in grain. The mix is put into a sillimanite crucible and an internal vacuum of 76 mm. established in the still. The charge is heated by high frequency induction of 380,000 cycles per second to above the boiling point of silicon, and a recovery of approximately 4 parts by weight brilliant silicon crystals (98.9% silicon) is recovered on condensation.

Owing to the tendency for a glow discharge to be generated inside the still under high vacuum and in the presence of substantial quantities of carbon monoxide (which are produced with silicon reduction) the pressure inside the still must be controlled accordingly to avoid such glow discharge and, for silicon, is not lower than 76 mm.

We claim:

1. A process for separating phosphorus, sodium, silicon, sulphur or aluminium from compounds containing any one of the aforesaid elements, which comprises mixing the compounds with a quantity of graphitic carbon, as reducing-agent, in excess of that required to reduce the element present in the compound and heating the mix by high frequency induction to a temperature above the boiling point of the element but below the boiling point of the compound in which the element is contained in a closed still maintained at a barometric pressure not higher than 180 mm. and distilling the element from the reaction mix without liquefaction of the mix, and continuously extracting from the still the gases resulting from the reaction and separating the element from the extracted gases by fractional condensation.

2. A process for separating phosphorus from ores containing phosphorus which comprises mixing the ores with a quantity of graphitic carbon, as reducing-agent, in excess of that required to reduce the phosphorus present in the ores and heating the mix by high frequency induction to a temperature of about 600° C. in a closed and sealed still maintained at a barometric pressure not higher than 180 mm. and distilling the phosphorus from the reaction mix without liquefaction of the mix, and continuously extracting from the still the gases resulting from the reaction and separating the phosphorus from the extracted gases by condensation under water.

3. A process for separating phosphorus from low grade phosphoric iron ore which comprises mixing the ore with graphitic carbon and heating the charge by high frequency induction in a closed still at a temperature of about 600° C. and under a pressure not higher than 180 mm. barometric pressure, continuously evacuating the gases resulting from the reaction and discharging them under cooled water to eliminate the vaporized phosphorus, and, after the evolution of vaporized phosphorus has ceased, by-passing the gases directly to the evacuating means and increasing the temperature of the residual mass until the iron is in a molten condition and tapping off the molten metal from the still.

4. A process for separating phosphorus from low grade phosphoric iron ore which comprises mixing the ore with graphitic carbon of granular size approximating to ¾", and heating the charge by high frequency induction of the order of 300,000 cycles per second in a sealed still and located around a graphitic carbon core to a temperature of about 600° C. and under a pressure not higher than 50 mm. barometric pressure, maintaining the said temperature thermostatically, continuously evacuating the gases resulting from the reaction and discharging them under cooled water to eliminate the vaporized phosphorus, and after the evolution of vaporized phosphorus has ceased, cutting out the thermostatic control of the temperature, by-passing the gases directly to the evacuating means, and increasing the temperature of the residual mass until the iron is in a molten condition, and tapping off the molten metal from the still.

5. A process for separating aluminium from its compounds which comprises mixing the aluminium compound with graphitic carbon and heating the charge by high frequency induction of the order of 300,000 cycles per second in a sealed still and under a pressure not higher than 180 mm. barometric pressure, and subliming the metallic aluminium from the mix.

6. A process for separating aluminium from bauxite which comprises mixing the bauxite in a finely divided condition with finely divided graphitic carbon, and heating the charge by high frequency induction of not less than 300,000 cycles per second in a sealed still and under a pressure of the order of 20 mm. barometric pressure and to a temperature below the fusion point of bauxite but above the boiling point of aluminium, continuously evacuating the gases resulting from the reaction and separating the aluminium from the extracted gases by fractional condensation.

7. A process for separating silicon from compounds of silicon which comprises mixing the silicon compound in a finely divided condition with finely divided graphitic carbon and heating the charge by high frequency induction of not less than 300,000 cycles per second in a sealed still and under a pressure not higher than 180 mm. and not lower than 76 mm. barometric pressure and shock cooling the vaporized silicon resulting from the reaction.

HAROLD ALEXANDRE BLACKWELL.
WILLIAM LAWRENCE TURNER.